UNITED STATES PATENT OFFICE.

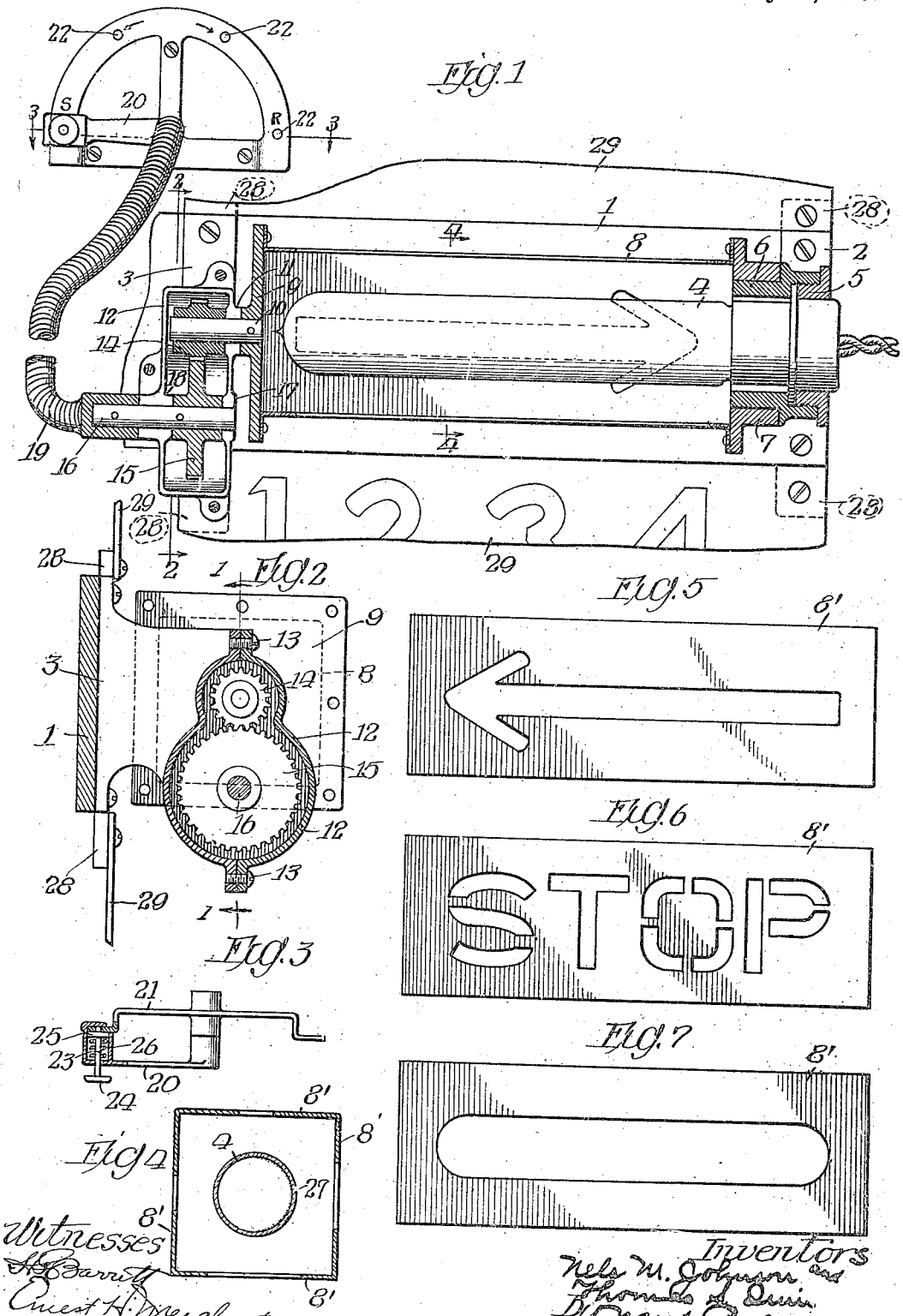

NELS. M. JOHNSON AND THOMAS S. QUIN, OF CHICAGO, ILLINOIS.

SAFETY-INDICATOR AND LICENSE-BRACKET.

1,234,546.  Specification of Letters Patent.  Patented July 24, 1917.

Application filed June 26, 1916. Serial No. 105,832.

*To all whom it may concern:*

Be it known that we, NELS. M. JOHNSON and THOMAS S. QUIN, citizens of the United States, both residing at Chicago, in the county of Cook and State of Illinois, have jointly invented certain new and useful Improvements in Safety-Indicators and License-Brackets, of which the following is a specification.

This invention relates to indicators for vehicles and has for its object the provision of a device adapted to normally operate as a tail light and which is readily controllable to indicate to persons in the rear of the vehicle the intended movements of the driver thereof.

A further object of our invention is the provision in a device as above described of means for supporting and illuminating one or more license plates.

Further objects and advantages of our invention will be apparent as it is better understood by reference to the following specification when read in connection with the accompanying drawing, illustrating the preferred embodiment thereof, in which—

Figure 1 is a longitudinal section through the device according to our invention;

Fig. 2 is a section on the line 2—2 of Fig. 1;

Fig. 3 is a section on the line 3—3 of Fig. 1;

Fig. 4 is a section on the line 4—4 of Fig. 1, and

Figs. 5, 6 and 7 represent three of the faces of the casing bearing indicating symbols.

Referring to the drawing, 1 indicates a base which may be secured to the vehicle in any suitable manner. Brackets 2 and 3 are secured to the base 1 in spaced relation, the bracket 2 being arranged to provide a lamp socket in which an electric lamp 4 is maintained by a threaded collar 5. The bracket 2 is further provided with a bearing portion 6 to support the bearing 7 at one end of a rectangular casing 8 of sheet metal or other suitable material having a plurality of faces 8'. The other end of the casing 8 is provided with a cap 9 having a spindle 10 which is supported in a bearing 11 formed in the housing 12 and the bracket 3, the housing 12 being secured to the bracket 3 by screws 13.

A pinion 14 is secured to the spindle 10 within the housing 12 and meshes with a gear 15 secured to a spindle 16 mounted in bearings 17 and 18 formed in the housing 12 and the bracket 3. A flexible shaft 19 is secured at one end to the spindle 16 and at the other to an arm 20 pivotally mounted on a segment 21 which may be mounted on the vehicle at a point convenient to the driver thereof. The segment 21 is provided with a plurality of spaced openings 22 and the arm 20 is provided with a pin 23 having a head 24 and a flange 25. A spring 26 is disposed between the flange 25 and the arm 20 to normally force the pin 23 toward the segment 21. When the arm 20 is moved to position adjacent either of the openings 22 the pin 23 will slip into the opening to retain the arm 20 in adjusted position. Obviously, as the arm 20 is turned about its pivot the casing 8 will be rotated through the medium of the gear 15 and the pinion 14 to display one or the other of its faces.

The faces 8' of the casing 8 are opaque and are provided with transparent indicating symbols as indicated in Figs. 1, 5, 6 and 7. The arrows shown in Figs. 1 and 5 indicate the direction in which the driver of the vehicle intends to turn. The face shown in Fig. 6 indicates that the driver intends to stop while that shown in Fig. 7 is the normal running position of the casing 8. A portion 27 of the surface of the lamp 4 is colored, preferably red, and this portion of the surface is directed rearwardly from the vehicle so that the several symbols show in red when the casing 8 is rotated to selectively display the desired face. The remaining portion of the surface of the lamp 4 is uncolored. The segment 21 is provided with indicating symbols on its face adjacent the openings 22 corresponding to those on the faces 8' of the casing 8; the letter R, for example, indicating the running position displaying the face illustrated in Fig. 7; the letter S indicating the stop position displaying the face illustrated in Fig. 6, and the two arrows corresponding to the faces illustrated in Figs. 1 and 5.

The brackets 2 and 3 are provided with extensions 28 to which the license plates 29 may be readily secured. When the license plates 29 are so attached to the device the light escaping through the transparent portions of the faces 8' contiguous to the plates illuminates the numbers thereon so that they may be easily read at a considerable distance.

The operation of our device will be readily understood from the following brief description thereof. The arm 20 is normally disposed with the pin 23 engaging the opening 22 at the point indicated by the letter R and the face 8' illustrated in Fig. 7 is exposed to display the usual red tail light. When the driver intends to turn in either direction he first releases the pin 23 from the opening 22 in which it is engaged and swings the arm 20 to engage either of the openings 22 adjacent the arrows on the segment 21, indicating the desired direction. The casing 8 is thereby rotated to expose the selected face 8' and the arrow is shown in red to indicate to persons in the rear of the vehicle the intention of the driver thereof. When the driver intends to stop the arm 20 is swung to the position indicated in Fig. 1 to display the face 8' illustrated in Fig. 6.

From the foregoing it will be readily understood that we have perfected a signal device which is readily operable by the driver of a vehicle to indicate his intentions clearly to persons in the rear of the vehicle and that the same device provides a support for one or more license plates and for the illumination of such plates as is usually required by law.

It will be apparent that various changes may be made in the form, construction and arrangement of the parts without departing from the spirit and scope of the invention or sacrificing any of its material advantages, the form hereinbefore described being merely a preferred embodiment thereof.

We claim:

1. In a device of the character described, the combination of a rotatable casing provided with a plurality of opaque faces, transparent indicating symbols on the respective faces, an electric lamp fixedly mounted and projecting within said casing, the outwardly directed portion of the surface of said lamp being colored, and means for rotating said casing.

2. In a device of the character described, the combination of a base, a casing rotatably mounted on said base and provided with a plurality of opaque faces, transparent indicating symbols on the respective faces, an electric lamp fixedly mounted in said base and projecting within said casing, the outwardly directed portion of the surface of said lamp being colored, means for securing a license plate to said base, whereby said plate is illuminated by the light escaping through the transparent symbol on the face of said casing contiguous thereto, and means for rotating said casing.

3. In a device of the character described, the combination of a base, a pair of brackets thereon, an opening in one of said brackets providing a socket for an electric lamp, a threaded collar to retain said lamp in said socket, a bearing on said bracket surrounding said socket, a casing journaled at one end on said bearing and provided at the other with a cap carrying a spindle, a bearing in the other bracket to receive said spindle, means for rotating said spindle, and transparent indicating symbols on said casing.

NELS. M. JOHNSON.
THOMAS S. QUIN.

Witnesses:
  WM. O. BELT,
  W. T. WESTERBERG.